July 28, 1959    D. D. PEEBLES    2,897,084
COFFEE PRODUCT AND METHOD OF MANUFACTURE
Filed Feb. 9, 1956
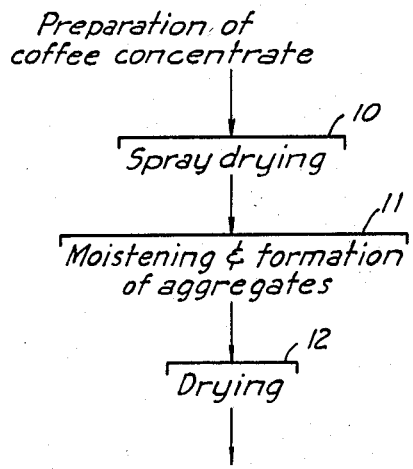
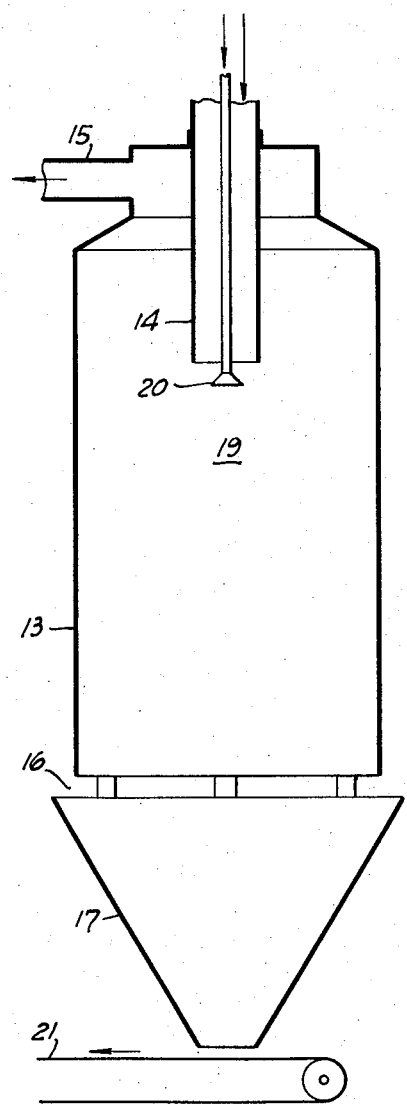
INVENTOR.
David D. Peebles
BY
ATTORNEYS

United States Patent Office 2,897,084
Patented July 28, 1959

2,897,084

COFFEE PRODUCT AND METHOD OF MANUFACTURE

David D. Peebles, Davis, Calif., assignor, by mesne assignments, to Foremost Dairies, Inc., San Francisco, Calif., a corporation of New York Application February 9, 1956, Serial No. 564,397

4 Claims. (Cl. 99—71)

This invention relates generally to dry coffee extracts, and to processes for manufacturing the same.

Dry coffee extracts are commonly manufactured by deriving a hydrous extract concentrate from roast coffee beans, after which the concentrate is converted to dry form by suitable drying equipment, such as spray driers. When the particle size of the product is such that it is in the form of a granular powder, it readily disperses in warm water and is generally referred to as "instant coffee." A fine particle size is no desirable because when a mass of such material is contacted with water, an outer sticky layer is formed that tends to block penetration of water into the interior of the mass. Thus such material does not disperse freely in water, and in addition it does not have the desired free-flowing characteristics. The spray drying equipment generally employed for producing the granular "instant coffee" is relatively large and is equipped with atomizing nozzles capable of producing a coarse particle. The drying chamber must be relatively high to make possible suspension of the particles in the drying gas sufficient to dry the coarse particles. For the size of equipment involved, the capacity is relatively low. An undesirable feature of such a spray drying operation is that a high percentage of fines is produced, which is removed from the coarser material by screening. The coarser particles of the final product are in the form of friable hollow spheres, in which the fine material consists mainly of sphere fragments. The fines are either lost to the process, or an effort is made to return them to the concentrate being supplied to the spray drying operation, which is deemed undesirable.

In general it is an object of the present invention to provide a process capable of producing a superior instant coffee product.

Another object of the present invention is to provide a novel process for the manufacture of coffee extract in dry granular form without any production of any substantial amount of fines.

Another object of the invention is to provide a process of the above character which permits the use of high capacity compact drying equipment.

Another object is to provide a new instant coffee product having superior properties.

Additional objects and features of the invention will appear from the following description in which the preferred embodiment has been set forth in detail in conjunction with the accompanying drawing.

Referring to the drawing:

Figure 1 is a flow sheet outlining one procedure for carrying out the invention.

Figure 2 is a side elevational view illustrating suitable equipment for carrying out the moistening and agglomerating operation.

In accordance with the present invention, roast coffee beans, after grinding, are subjected to known treatment for producing a hydrous coffee extract or concentrate. In a typical instance the treatment may involve counter-flow contact of hot water with the ground roast coffee to produce the desired concentrate. Such a concentrate contains some finely divided solids in suspension, together with dissolved solids and solids in colloidal solution. An effort is made to retain desired flavor components and aromatic constituents. This concentrate is then subjected to a spray drying operation to produce a finely divided dry product. The fine powder, with or without intervening storage, is then subjected to treatment in which it is moistened to make the particles sticky, and the particles caused to contact and adhere together to form random agglomerates of substantial size. Subsequent final drying of the agglomerates serves to produce the desired final product.

My process is outlined in the flow sheet of Figure 1. The hydrous coffee concentrate, which may contain from say 20 to 28% solids, is shown being supplied to the spray drying operation 10. The resulting finely divided dry powder is supplied to the step 11 in which the particles are moistened, and the random agglomerates are formed. In the final drying operation 12 the moist agglomerates are reduced to a proper moisture content (e.g. 1–3%) for packaging and marketing.

Instead of using the bulky driers previously employed for producing granular instant coffee, I employ compact spray driers of the type used in the dairy industry for drying milk products (see for example 2,575,119 and 2,473,035). The atomizing means employed can be of the centrifugal type to produce a finely divided particle for drying. The temperatures and flow rates of drying gas can be substantially the same as used in the drying of liquid milk products.

The operation 11 can be carried out by the use of apparatus as shown in Figure 2. It consists of a vertical chamber 13 having a downwardly extending inlet conduit 14 for continuously introducing the powdered coffee as conveyed pneumatically from a supply hopper. Some air is continuously removed from the chamber through conduit 15, whereby air is drawn into the chamber through the lower opening 16 between the main part of the chamber and the discharge hopper 17. The powdered coffee fed to the equipment passes through a treatment zone 19 where it is commingled with finely atomized water discharged from the atomizing nozzle 20. The particles of falling powder acquire moisture in the zone 19, whereby the particles are made sticky, and the simultaneous commingling of this material causes random contacts and adherence between the sticky particles with the result that aggregates are formed having a size substantially greater than the particle size of the original powder. The aggregates discharging from the lower end of the equipment may have a moisture content (total) ranging from about 9 to 12%, about 11 to 12% being deemed optimum. The powder and air entering the chamber through conduit 14 can be ambient, such as from 60 to 90° F. The temperature in zone 19 is somewhat less than ambient, due to water evaporation, and may for example range from 55 to 80° F. Water at tap temperature can be supplied to nozzle 20, as for example from 50 to 70° F. Elevated treatment temperatures causes the particles to become too soft and sticky, with the result that the material builds up on the walls of the chamber and is a sticky mass of coalesced material as discharged. The same detrimental results are obtained when the amount of moisture supplied is excessive.

As stated above, in passing through the zone 19 the individual particles of the spray dried coffee powder acquire moisture which causes them to become sticky, This absorption of moisture is by virtue of the absorptive nature of certain solid constituents present, including soluble solids, and solids capable of colloidal solution in water. Such sticky particles are capable of forming firm random attachments when commingled, thereby forming relatively firm porous aggregates capable of retaining their identity and withstanding handling during final drying.

The time period of treatment in the equipment of Figure 2 may range from 5 to 30 seconds. The discharging material is carried by suitable conveying means, such as an endless belt conveyer 21, to the finishing drier.

The drying equipment employed for removing excess moisture from the aggregates should leave the aggregates relatively intact, or in other words should involve a minimum amount of grinding or crushing. Also the drying temperatures employed should be kept relatively low, at least for the initial stages of drying, to avoid melting and resulting coalescing or cementing together of the aggregates. Suitable equipment for this purpose employs a screen provided with small perforations, and which is vibrated to cause the material to progress from the feed to the discharge end of the same, and to apply vertical motion to maintain the powder as a loose working layer. In conjunction with the vibrating action, warm dry air is delivered upwardly through the screen to pass upwardly through the layer of powder. The number and size of the openings in the screen is so chosen in relation to the rate of air delivery therethrough that the product moving along the screen is fluffed or levitated to form a layer several times the thickness it would normally have if at rest. By this technique the product is caused to progress along the screen and is at least partially supported by the cushion of air intermingled therewith. This provides drying action without rough or mechanical handling which might break up the aggregates. The temperature of the drying air (inlet) for the first stage of such drying can be of the order of 150 to 175° F. (160° F. optimum). After the moisture content has been reduced to about 6 to 7%, drying can be continued in a subsequent stage or stages with drying air (inlet) at a temperature of from 250 to 300° F., to produce a final moisture content of from 1 to 3%. Following final drying the material may or may not be subjected to screening or like sizing operations, to produce a final product of relatively uniform size. Oversized particles may be subjected to light crushing.

A typical product made according to the present process has a particle size such that the bulk of the material remains on an 80 mesh screen. The amount of fines produced is insignificant, but if desired any such material may be removed by screening and returned to the process at the head of operation 11, or in other words mixed with the incoming spray dried powder.

An instant coffee product made in accordance with the foregoing process has a number of novel and desirable characteristics. It has superior properties with respect to dispersion in cold or warm water, which is attributed to the fact that the individual fragments are in the form of porous aggregates, formed by the random attachment of the original spray dried particles. When immersed in water a mass of such material is not subject to blocking, but on the contrary water readily penetrates the mass to facilitate quick dispersion. The product is relatively free-flowing, and can be packaged in containers of the type provided with a pouring spout. The color is an attractive deep brown, in contrast with the leathery color of conventional instant coffee.

A particular feature of the foregoing process is that it eliminates the bulky spray drying equipment heretofore employed commercially, and in addition it avoids the production of a high percentage of fines. Because the process initially produces a finely divided powdered product, it makes possible the use of a compact high-capacity spray drying equipment, thus materially reducing cost of manufacture. The elimination of fines reduces losses and eliminates troublesome reprocessing.

In the procedure described above a finely divided powder is prepared by spray drying and then all of such powder is treated in the subsequent steps. Another procedure is to employ only fines produced in a conventional process (as heretofore described) for the manufacture of instant coffee, in which event the fines are caused to produce a product in the form of aggregates which may be packaged separately or blended with the conventional instant coffee fraction.

By way of example in one particular instance the process was operated as follows. Fines were supplied from a conventional instant coffee processing plant employing a large spray drying chamber and a low pressure atomizing nozzle. Substantially all of the material passed through a 100 mesh screen, and the moisture content was about 1.5% (total). This spray dried material was then supplied to the equipment shown in Figure 2, with the admission of water being controlled to provide a moisture content of about 12% (total) for the discharging aggregates. The average temperature in zone 19 was about 70° F. Finish drying was carried out in two stages by use of the shaker type of drier previously described. The temperature of the inlet drying air was maintained at about 160° F. until the moisture content had been reduced to about 7%, and thereafter the inlet drying air temperature was raised to about 250° F. to reduce the moisture content to about 1.5% (total). The final product was a free-flowing granular material comprising porous random aggregates. It readily dispersed in either cold or hot water by simple stirring. It was free-flowing, and had an attractive dark brown color. The bulk of the material remained upon an 80 mesh screen, and the percentage of fines was insignificant.

I claim:

1. In a process for the manufacture of a dry coffee product, drying a hydrous coffee concentrate to produce a finely divided powder, moistening the particles of the powder whereby they are made sticky and causing the sticky particles to contact and adhere together in the form of moist porous aggregates, and then removing excess moisture from the unchanged aggregates.

2. In a process for the manufacture of a dry coffee product, spray-drying a hydrous coffee concentrate to produce a finely divided powder, causing the powder particles to pass through a treatment zone, introducing atomized water droplets into the treatment zone whereby the particles of powder are caused to absorb moisture and thereby made sticky, commingling the sticky particles whereby they are brought into contact to form porous random aggregates, and then removing excess moisture from the unchanged aggregates.

3. In a process for the manufacture of a dry coffee product, spray drying a hydrous coffee concentrate to produce a finely divided powder, causing the powder in dispersed condition to pass through a treatment zone having an average treatment temperature of the order of from 50 to 80° F., continuously introducing atomized water droplets into said zone, the powder particles in said zone absorbing moisture whereby they are made sticky and said sticky particles being commingled to cause random attachment between the same thereby resulting in the formation of moist porous aggregates of a size substantially greater than the particle size of the original powder, the amount of moisture supplied to the material being such that said porous aggregates have a total moisture content of the order of from 9 to 12%, and evaporating excess moisture from the unchanged porous aggregates by contact with drying gas to provide a final product having a moisture content of the order of from 1 to 3%.

4. In a process for the continuous manufacture of a dry coffee product, spray drying a hydrous coffee concentrate to produce a finely divided powder, causing the powder in dispersed condition to pass through a treatment zone having an average treatment temperature from 50° to 80° F., continuously introducing atomized water droplets into said zone, the dispersed powder particles in said zone absorbing moisture whereby they are made sticky and commingled to cause random attachment between the same thereby forming moist porous aggregates of a size substantially greater than the particle size of the original powder, collecting the aggregates from said zone without compacting the same, transferring the uncompacted aggregates to a drying operation in which the uncompacted aggregates are contacted with a drying gas to produce a final product having a moisture content of from 1 to 3%.

References Cited in the file of this patent

UNITED STATES PATENTS

| | | |
|---|---|---|
| 133,884 | Partz | Dec. 10, 1872 |
| 333,652 | Matthiessen | Jan. 5, 1886 |
| 1,240,020 | Boberg | Sept. 11, 1917 |
| 1,394,035 | MacLachlan | Oct. 18, 1921 |
| 1,826,701 | Ames | Oct. 13, 1931 |
| 2,016,592 | Chuck | Oct. 8, 1935 |
| 2,473,035 | Meade et al. | June 14, 1949 |
| 2,504,735 | Schwarz | Apr. 18, 1950 |
| 2,575,119 | Peebles et al. | Nov. 13, 1951 |
| 2,771,364 | Chase et al. | Nov. 20, 1956 |
| 2,788,276 | Reich | Apr. 9, 1957 |